United States Patent [19]

White et al.

[11] Patent Number: 4,499,488

[45] Date of Patent: Feb. 12, 1985

[54] AUTOMATIC REGISTRATION CONTROL SYSTEM FOR COLOR TELEVISION CAMERAS

[75] Inventors: Charles M. White; William J. Cosgrove, both of Quincy, Ill.

[73] Assignee: Harris Corporation, Melbourne, Fla.

[21] Appl. No.: 463,637

[22] Filed: Feb. 3, 1983

[51] Int. Cl.³ .............................................. H04N 9/09
[52] U.S. Cl. ..................................................... 358/51
[58] Field of Search ........................................ 358/51

[56] References Cited

U.S. PATENT DOCUMENTS

| | | |
|---|---|---|
| 3,621,122 | 11/1971 | Hipwell . |
| 3,692,918 | 9/1972 | Olson et al. . |
| 3,764,735 | 10/1973 | Dieter-Schneider et al. . |
| 3,830,959 | 8/1974 | Dischert et al. . |
| 3,925,812 | 12/1975 | Blom et al. . |
| 4,234,890 | 11/1980 | Astle et al. . |
| 4,310,855 | 1/1982 | Holzgrafe . |

Primary Examiner—Richard Murray
Attorney, Agent, or Firm—Yount & Tarolli

[57] ABSTRACT

A system for automatically setting up a color television camera. Register error is detected by correlating the times of occurrence of level transitions in two video signals. A unipolar pulse is provided in response to a level transition in one of the video signals, and a pulse having a positive and a negative lobe is provided in response to a level transition in the other of the video signals. The two pulse signals are multiplied. The product of the two pulse signals is integrated to produce a signal whose amplitude and polarity varies with register error. A microprocessor control system detects size and centering errors by measuring register error at different spots on the raster. Before correcting setup errors, the microprocessor verifies that there are adequate level transitions in the imaged scene by methodically adjusting the setup controls over a range of values and noting whether the measured register or size errors change accordingly.

22 Claims, 12 Drawing Figures

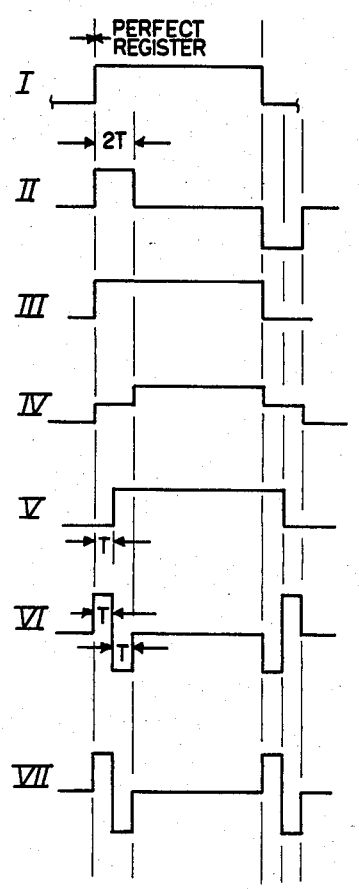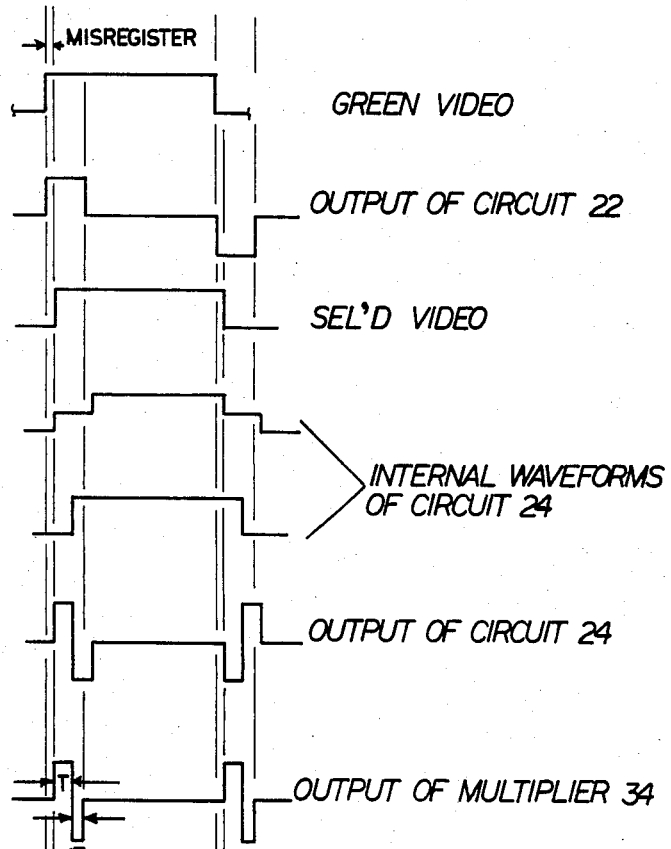
FIG.2A    FIG.2B
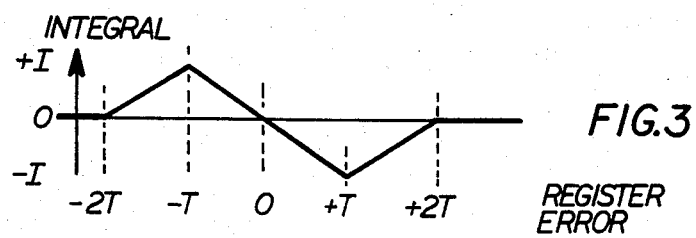
FIG.3

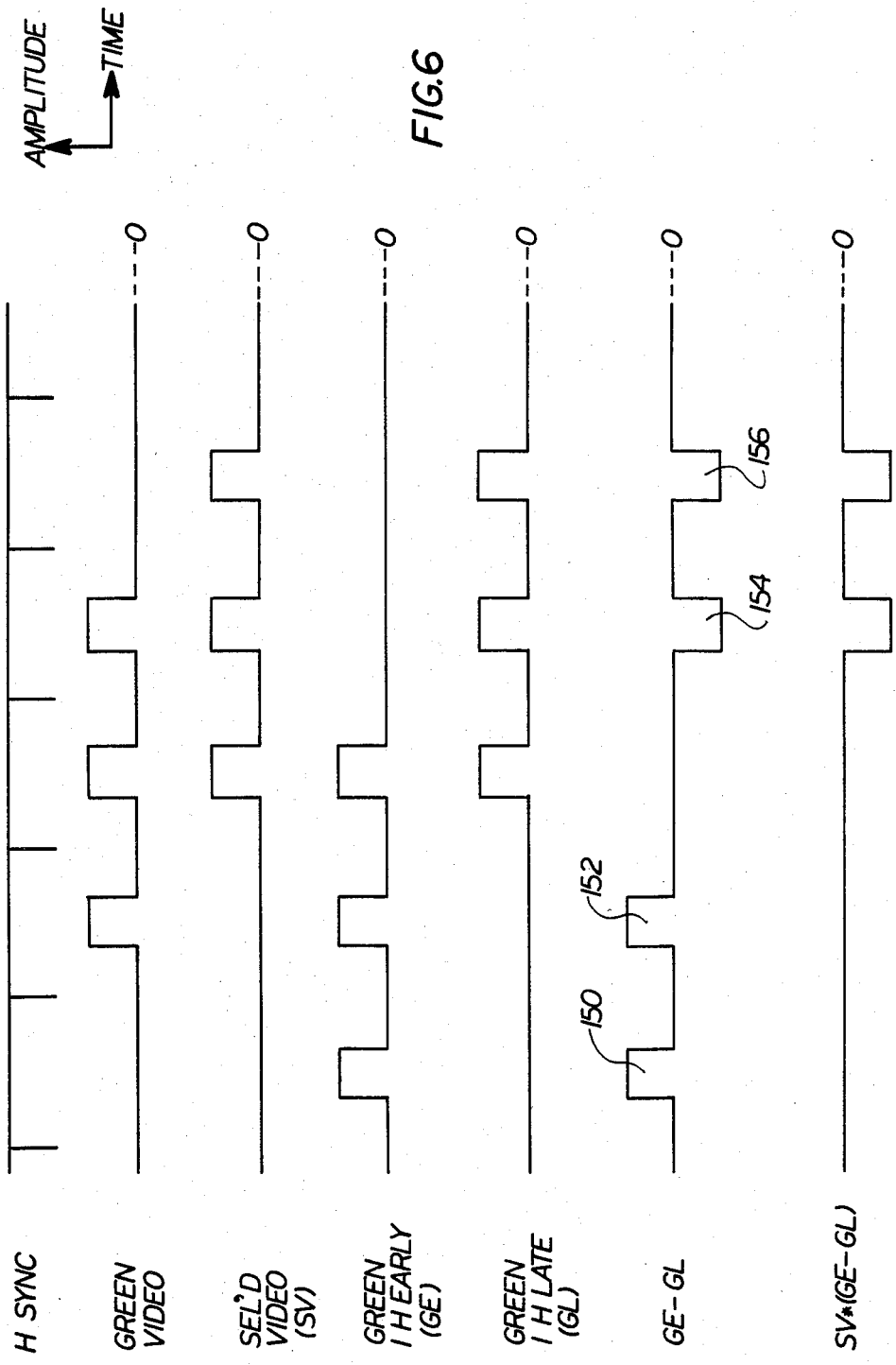

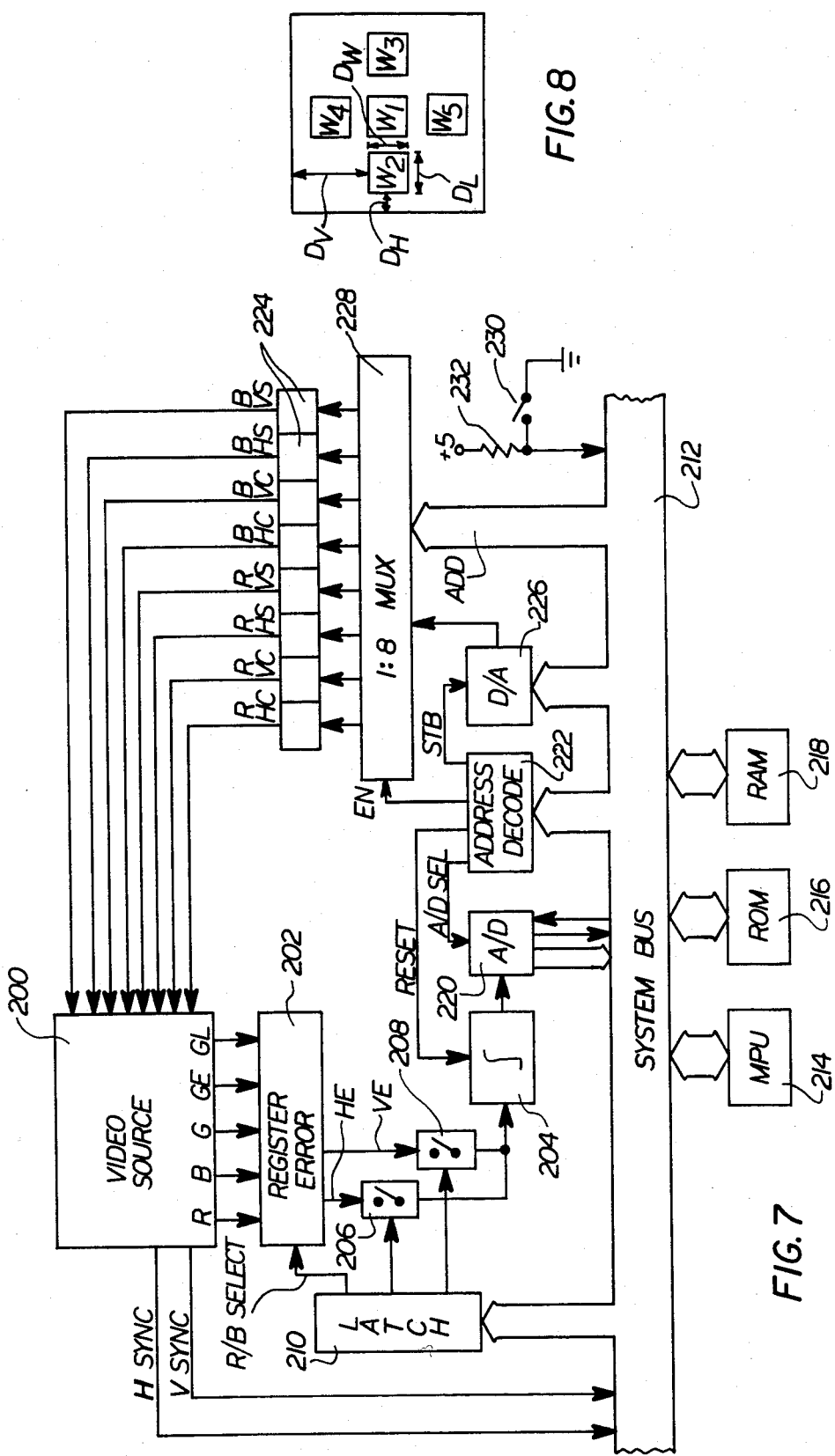

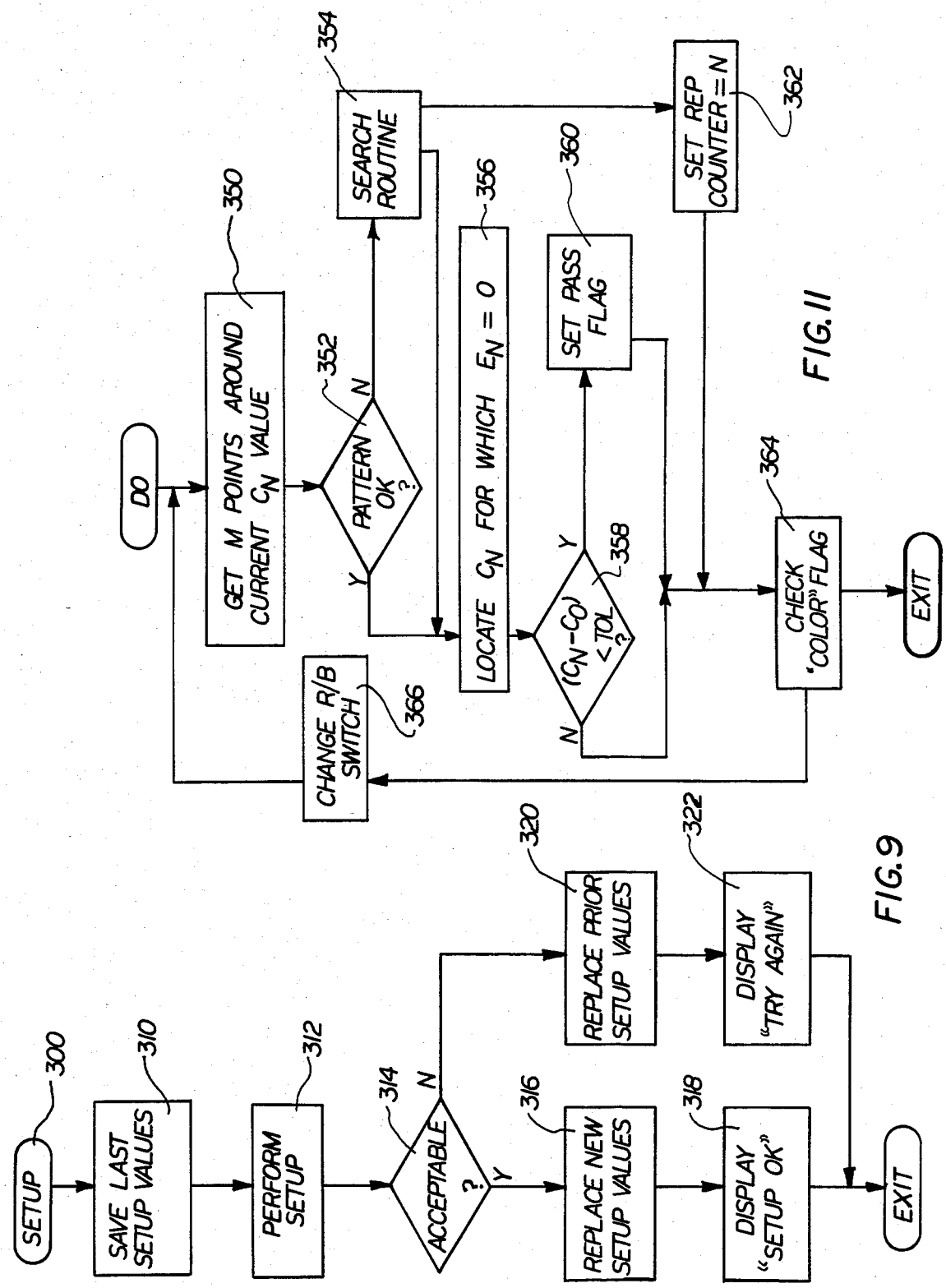

AUTOMATIC REGISTRATION CONTROL SYSTEM FOR COLOR TELEVISION CAMERAS

BACKGROUND AND FIELD OF THE INVENTION

The present invention relates to the art of television cameras, and more particularly to the art of automatic registration of color television cameras.

Broadcast color television cameras usually utilize two or more image pick-up devices. Each of the different color components of the scene being imaged is focused on the imaging surface of a respective image pick-up device. Each pick-up device scans its respective imaging surface to produce a video signal corresponding to the image focused thereon.

The color video signals must be properly synchronized with one another so as to simultaneously convey information relating to the same portion of the focused image. Any missynchronization, or "misregistration", will result in the plural color components of the imaged scene being offset from one another in the image presented on a television screen.

The registration adjustments necessary to arrive at the desired synchronization of the video signals are usually done by automatic electronic circuitry. Registration control circuitry can be provided which functions continuously during the operation of the television camera. The circuitry senses features of the video signals which correspond to details of the imaged scene, and then adjusts the video signals so that the features occur simultaneously in time in the different video signals. Patents disclosing systems of this nature include Monahan, U.S. Pat. No. 4,053,203 and Dischert et al., U.S. Pat. No. 3,830,959.

Recently, digital processing circuitry has been employed to initiate and complete the registration of the video signals during a "set-up" period prior to normal use of the camera. The camera is focused on a prearranged test chart having a white background with various well-defined indicia marked thereon. The indicia produce prominent features in the video signals generated by the camera which can then be readily detected and used by a digital processing system to determine the magnitude and direction of registration error. The same video signals are used to detect and match the horizontal and vertical sizes of the rasters scanned by the individual pick-up tubes, as well as to detect and correct for other things such as skew and nonlinearity. The patent to Astle et al., U.S. Pat. No. 4,234,890 discloses a system of this nature. Cameras are sometimes designed to include integral test chart projectors, referred to as "diascopes".

SUMMARY OF THE INVENTION

The present system provides apparatus for detecting misregistration between two or more color video signals without use of a specific set up chart and without including a chart projector, such as a diascope, within the camera structure.

The apparatus includes first means which is responsive to a first video signal for providing a first output signal including an AC pulse occurring in timed relation to an edge-representative transition in the first video signal. Second means is provided which is responsive to a second video signal for providing a second output signal including a unipolar pulse occuring in timed relation to an edge-representative transition in the second video signal. Means are also provided for multiplying the first and second output signal together to provide a product signal whose integral is dependent upon the relative times of occurrence of the AC and unipolar pulses in the first and second output signals, and thus upon the relative times of occurrence of the corresponding transitions in the first and second video signals. Finally, means are provided for integrating the product signal to provide an integral signal having a level dependent upon, and thus indicative of, the relative times of occurrence of the corresponding transitions in the first and second video signals.

The misregistration detection circuit is used in conjunction with a digital processing system for processing the output signals provided thereby, so as to provide registration correction for the color TV camera during a set-up period prior to normal use. During this set-up period, the camera is focused on a normal scene, rather than a conventional set-up chart, and gathers misregistration information from the misregistration detection apparatus briefly described above.

BRIEF DESCRIPTION OF THE DRAWINGS

The foregoing and other objects and advantages of the present invention will become more readily apparent from the following detailed description, as taken in conjunction with the accompanying drawings, wherein:

FIGS. 2A and 2B are timing diagrams illustrating the operation of the misregistration detection circuit of FIG. 1;

FIG. 3 is a graphical representation of the response characteristic of the circuit of FIG. 1;

FIG. 6 is a timing diagram illustrating the operation of the vertical misregistration detection circuit of FIG. 5;

FIG. 7 is an overall block diagram of a misregistration correction circuit employing digital processing;

FIG. 8 is a representation of the TV raster, illustrating the portions of the raster over which misregistration information is collected for use in the digital processing system of FIG. 7; and FIGS. 9-11 are flow charts indicating the operations performed by the microprocessor of the FIG. 7 misregistration correction circuit.

DETAILED DESCRIPTION

Figure 1:
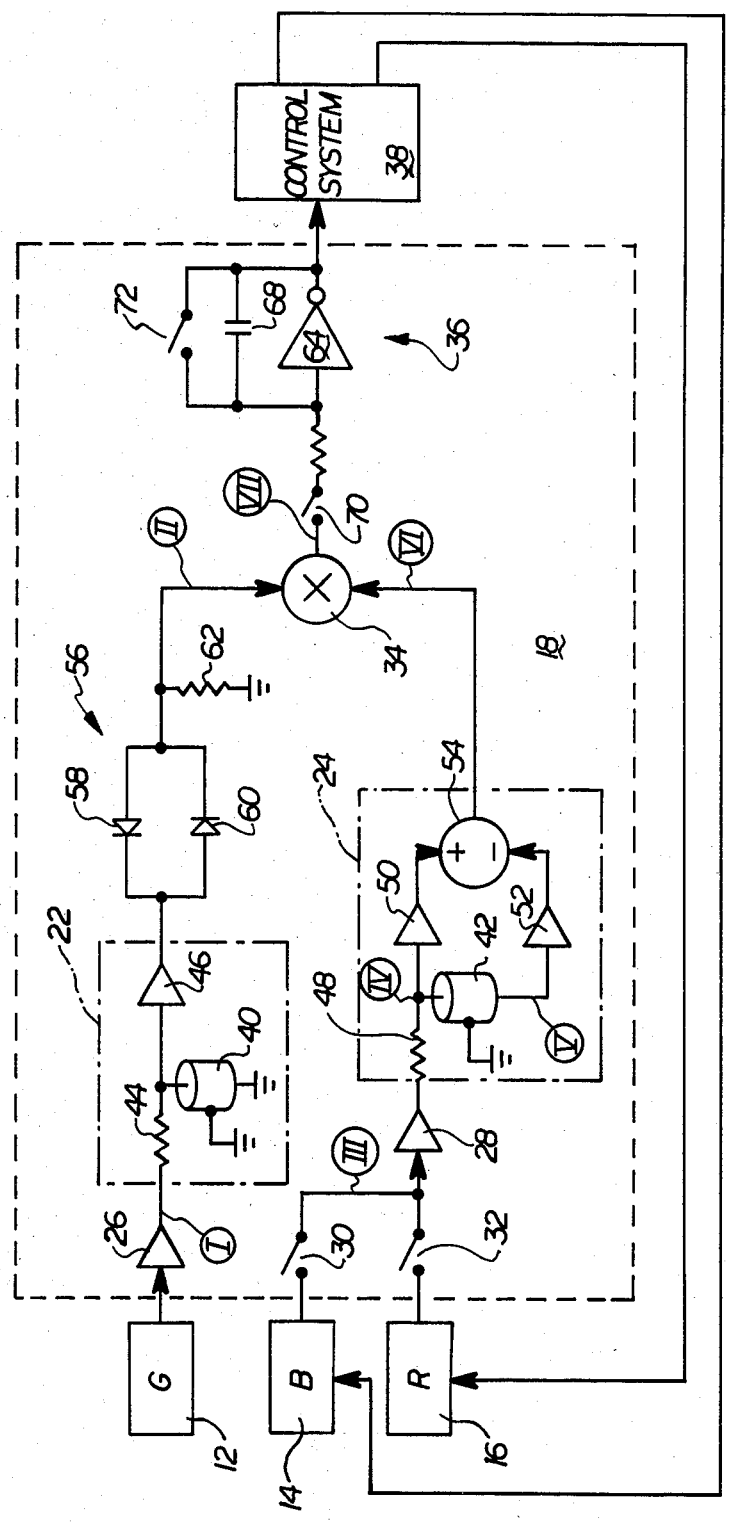
FIG. 1 is a block diagram of a misregistration detection and control system in accordance with the teachings of the present invention.

In FIG. 1 a portion of a color television camera 10 is shown including three imaging devices 12, 14 and 16. The three color imaging tubes provide video signals representative of different color components of the same imaged scene. In order for the subsequently displayed picture to represent the picture properly (i.e., with the three individual color components overlapping precisely), the information presented by the three video signals must be synchronized in time. In other words, a transition in the amplitude of the green video signal (provided by the green imaging tube 12) must occur simultaneously with corresponding transitions in the amplitudes of the blue and red video signals (provided by the blue and red imaging tubes 14 and 16). A misregistration detection circuit 18 determines whether the three video sigals are properly registered. The three video signals are supplied to the misregistration detection circuit 18, and are also provided to circuitry (not shown) which further processes and combines them for transmission to a remote image forming device.

The misregistration detection circuit 18 utilizes the green video signals as a reference, and compares the synchronism of the blue and red signals with the green signal so as to thereby match the timing of all three video signals. Misregistration detection circuit 20 includes two pulse forming circuits 22 and 24. The green video signal is applied to the input of pulse forming circuit 22 through a buffer amplifier 26. The blue and red video signals are applied to the input of a second buffer amplifier 28 through respective switches 30 and 32. The output of buffer amplifier 28 is connected to the input of the second pulse forming circuit 24. Consequently, either the blue or the red video signal can be applied to the input of the second pulse forming circuit 24 by closure of the appropriate switch 30 or 32.

The video signals include level transitions which represent edges of portions of the imaged scene. Pulse forming circuit 22 responds to the green video signal to provide a signal at its output which includes unipolar pulses generated in response to level transitions in the green video signal. The unipolar pulses occur in timed relation to the corresponding transition in the green video signal. The second pulse forming circuit 24, on the other hand, responds to whichever of the two other video signals is supplied to the input thereof (hereinafter referred to as the "selected video signal" to provide an output signal which includes AC pulses generated in response to level transitions in the selected video signal. The AC pulses occur in timed relation to the corresponding transitions in the selected video signal.

FIGS. 2A and 2B are waveform diagrams showing waveforms at various places throughout the circuit of FIG. 1 under conditions in which register between the green and selected video signals is perfect (FIG. 2A) and wherein some degree of misregistration exists (FIG. 2B). In FIGS. 2A and 2B the green and selected video signals are represented as having a simplified form, initially having zero amplitude, transitioning to some positive level, and at some time thereafter returning to a zero amplitude level. Signals such as these would be produced when the camera was pointed, for example, at a white object superimposed on a black background. As shown in FIGS. 2A and 2B, the output of circuit 22 (represented as waveform II in FIGS. 2A and 2B) includes pulses, where each pulse has a single polarity. The leading edge of each pulse is aligned with the video signal level transition producing the pulse.

The polarity of each pulse is the same as the polarity of the green video signal transition producing that pulse. Thus, when the green video undergoes a positive transition, from a zero amplitude to some positive amplitude, for example, the output pulse has a positive polarity. When the green video signal undergoes a negative transition, returning from a positive amplitude level to a zero amplitude level, for example, the output signal of circuit 22 includes a negative polarity pulse. Each pulse, considered individually, however, is unipolar.

The output signal provided by circuit 24 is represented as waveform VI in FIGS. 2A and 2B. Waveform IV includes features generated in response to the transitions in the selected video signal (III), where the polarity of the initial half cycle of the feature is dependent upon the direction of the transition in the selected video signal. Each of these features, which will be referred to hereinafter as "AC pulses", includes both a positive polarity portion and a negative polarity portion. The leading edge of each AC pulse is aligned with the video signal level transition producing that pulse. The integral of this signal is zero since the two portions of the AC pulses are of equal magnitude and duration, but have opposite polarities.

The output signals provided by the pulse forming circuits 22 and 24 are multiplied together in an analog multiplier circuit 34. The output of multiplier 34 is represented as waveform (VII) in FIGS. 2A and 2B. In the situation illustrated in FIG. 2A there is perfect register between the green video and selected video signals. The pulse generated by the pulse forming circuit 22 then perfectly overlaps the AC pulses provided by pulse forming circuit 24. Consequently, the integral of the product signal appearing at the output of the multiplier 34 is zero.

In the situation illustrated in FIG. 2B some misregister exists between the green video and a selected video. The pulses provided by pulse forming circuit 22 are therefore misregistered with respect to the AC pulses provided at the output of pulse forming circuit 24. Consequently, not all of the AC pulse is multiplied by the same amount. Whereas the majority of the AC pulse is multiplied by a nonzero DC level corresponding to the amplitude of the pulse at the output of circuit 22, some residual portion is multiplied by a zero amplitude signal. This has the effect of eliminating a portion of either the positive or the negative lobe of each AC pulse. As a consequence, the integral of the output of multiplier 34 is no longer be zero, instead assuming some value related to the extent of misregistration between the two video signals. The integral is positive in the example of FIG. 2B. If the misregister were in the opposite direction the polarity of the integral would be negative instead of positive.

In the circuit of FIG. 1, an integrater 36 is provided for integrating the product signal appearing at the output of multiplier 34 so as to thereby provide a register error signal having a polarity and magnitude respectively indicative of the direction and extent of misregister of the green and selected video signals. FIG. 3 is a graph showing the manner in which the register error signal changes with register error. In the graph, the vertical axis represents the magnitude of the integral, or "register error", signal provided by integrator 36. The horizontal axis represents register error in terms of time displacement between the selected video signal and the green video signal. "T" represents the length of the time delay introduced by each of the delay lines 40 and 42.

The output of integrator 36 is applied to a control system 38. The control system 38 responds by providing appropriate control signals to the blue or red video signal sources 14 and 16 so as to correct the misregistration thus measured, i.e., to return the register error signal to zero.

In FIG. 1, the pulse forming circuits 22 and 24 each include analog delay devices 40 and 42 for use in generating the pulses in response to transitions in the respectively applied video signal. The delay devices 40 and 42 may take any conventional form, but are characterized in FIG. 1 as matched segments of transmission line. They each provide a fixed time delay of 140 nanoseconds in the example being described.

In the pulse forming circuit 22, the green video signal is applied to one end of the transmission line 40 through an impedance 44 matching the characteristic impedance of the transmission line 40. Because of this there will be no reflection of signal from the junction between the impedance 44 and the transmission line 40 and the signal will, at least initially, divide equally across the impedance 44 and transmission line 40. The junction between impedance 44 and transmission line 40 is connected to the input of a high input impedance buffer amplifier 46 which provides a signal at its output which is indicative of the signal appearing at that junction. The other end of the transmission line 40 is grounded (as is the outer conductor of the transmission line). Although the transmission line provides a DC short of the signal applied thereto through the impedance 44, the transmission line exhibits inductive and capacitive impedances whereby transitions in the signal applied to the transmission line are not instantly propagated through it. Thus, when the applied signal undergoes a sharp transition, the signal at the output of buffer amplifier 46 will transition to a corresponding nonzero amplitude for the period of time necessary for the signal to be transmitted through the transmission line 40, and reflected back from the DC short at the end of the line. If the transmission line 40 provides a delay of 140 nanoseconds, then 280 nanoseconds will pass before the signal at the output of the high impedance buffer 46 returns to a ground level. In the interim the applied signal will divide equally across the impedance and the transmission line, hence the output of buffer amplifier 46 will have only half the amplitude of the input signal. Each sharp transition in the green video signal applied to the pulse forming circuit 22 therefore produces a half-amplitude feature in the output of buffer amplifier 46 having a duration of 280 nanoseconds.

The transmission line 42 of pulse forming circuit 24 is connected in a somewhat different fashion. One end of the transmission line 42 is again connected to the output of the corresponding buffer amplifier 28 through an impedance 48 which matches the characteristic impedance of the transmission line 42. Furthermore, the junction between the impedance 48 and trasmission line 42 is again monitored by a high input impedance buffer amplifier 50, and the shield of the transmission line 42 is again grounded. The other end of the transmission line 42, however, is connected to a second high input impedance buffer amplifier 52 whose input impedance is great enough that that end of the transmission line 42 may be considered to be a D.C. open circuit.

When a signal level transition appears at buffer amplifier 50, the transmission line 42 introduces a delay of 140 nanoseconds before that signal level transition arrives at the other end of the transmission line (i.e., at the input of buffer amplifier 52). The signal appearing at the input to the buffer amplifier 50 is at that time only approximately one-half of the amplitude of the signal appearing at the output of buffer amplifier 28. After 280 nanoseconds, however, (i.e., the time necessary for the signal level transition to travel through the transmission line 42, be reflected off the open end of the transmission line, and return back through the transmission line) virtually the entire input signal appears at the inputs to both buffer amplifiers 50 and 52. Waveforms IV and V respectively represent the waveforms appearing at the inputs to buffer amplifiers 50 and 52 in pulse forming circuit 24 of FIG. 1.

The output signals provided by buffer amplifiers 50 and 52 are subtracted from one another in a subtractor circuit 54 so as to generate an output signal having the form represented at VI in FIGS. 2A and 2B. This difference signal represents the output of the second pulse forming circuit 24, and includes the "AC pulses" described previously with respect to that output signal.

In addition to the elements described above, the misregistration detection circuit 18 also includes a coring circuit 56 for reducing the noise content in the output signal provided by the first pulse forming circuit 22. The coring circuit 56 includes two diodes 58 and 60 connected anti-parallel with one another. The anti-parallel diodes are connected between the output of buffer amplifier 46 and the input of multiplier 34. Low amplitude signal components in the output of buffer amplifier 46 do not overcome the diode offset voltages, hence the two diodes 58 and 60 remain nonconductive for those signals. Low amplitude signals are thus not transmitted through the coring circuit. Higher amplitude positive or negative signals cause either diode 58 or 60 to become conductive whereby those signals are transmitted to the input to multiplier 34. A resistor 62 ties the input of multiplier 34 to ground so that it is not left floating when the diodes 58 and 60 are in their nonconductive states.

The integrater 36 is shown as having a conventional form, including an inverting buffer amplifier 64 with a capacitor 68 connecting its output to its input. Two switches 70 and 72 are included for controlling the operation of the integrator 36. The "window" switch 70 is connected between the output of multiplier 34 and the input of the integrator, and is opened and closed at appropriate times so that the integrator 36 only integrates the multiplier output for desired portions of the video signals. Preferably, the switch is opened and closed in synchronism with the line and field rates of the video signals and at such times that the integrater 36 responds to only those product signals produced from video signals representing a selected portion, or "window", of the scanned scene, such as the central portion or one of a number of selected peripheral portions.

The "reset" switch 72, on the other hand, is connected in shunt with a capacitor 68 and is used for discharging the capacitor 68 and thereby resetting the integrator. Switch 72 is briefly closed to reset the integrator immediately after the states of switches 30 and 32 have been alternated to connect a different one of the blue and red video signals into the second pulse forming circuit 24.

The switches 30, 32, 70 and 72 are preferably solid state analog switches whose states are controlled by logic signals generated by the control system 38. The switch 70 is controlled by a "window" signal which causes switch 70 to close whenever the video signals are conveying information representative of a selected portion of the imaged scene. At the conclusion of each of the integration windows, the control system 38 samples the output of the integrator 36, and then changes the states of the two switches 30 and 32. The control system 38 then resets the integrator 36 by momentarily closing the switch 72.

The output of integrator 36 immediately prior to being reset can be used to directly control the DC level of the deflection signal used to cause the horizontal scanning the associated image forming device. This DC level has the effect of adjusting the registration of the video signals, causing the misregistration measured by the circuit 18 to be corrected. The misregistration indication can also be used in conjunction with other misregistration indications, taken from the integrator output after different integration windows, to detect scanning errors other than horizontal registration. This is described further with respect to FIG. 8.

Figure 4:
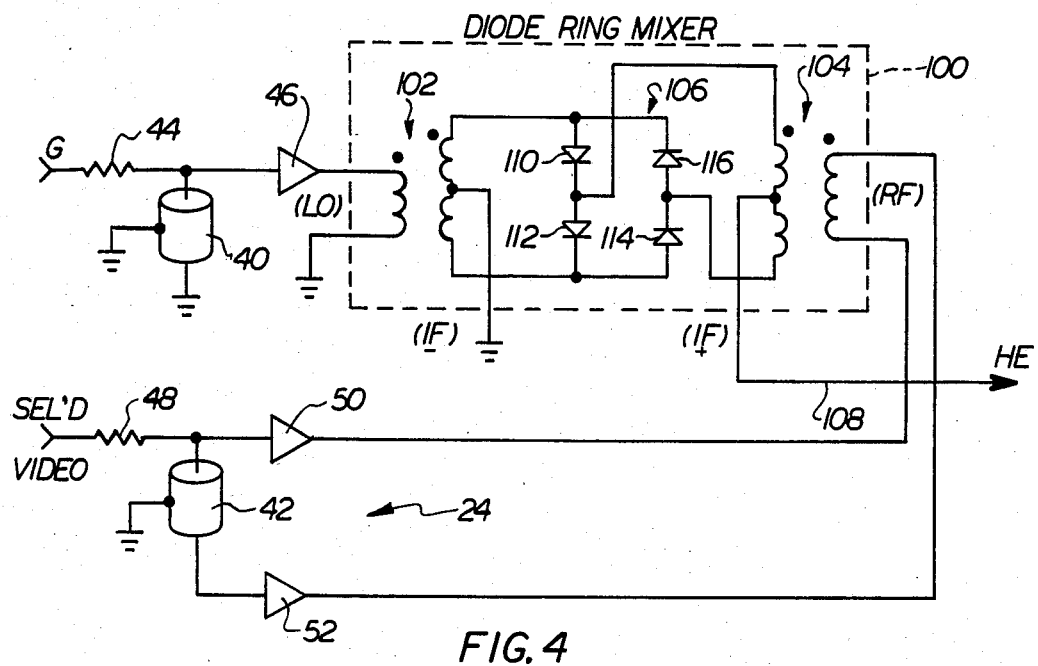
FIG. 4 is a circuit schematic of an alternative embodiment of the misregistration detection system of FIG. 1.

FIG. 4 is a circuit schematic of an alternative embodiment of the horizontal misregistration detection circuit of FIG. 1. In this Figure a diode ring mixer 100 is used to perform many of the functions performed by other elements in the circuitry of FIG. 1. More particularly, the diode ring mixer performs the coring function of coring circuit 56 of FIG. 1, the multiplication function of the multiplier 34 of FIG. 1, and the subtraction function of the subtractor 54 of FIG. 1. The pulse forming circuit 22 of FIG. 1 remains largely the same, and thus in the FIG. 4 embodiment also includes an impedance 44, a transmission line 40, and a buffer amplifier 46, all connected as in the FIG. 1 embodiment. The output of the buffer amplifier 46, however, instead of being provided to a coring circuit 56 as in FIG. 1, is instead applied to the "local oscillator" input (LO) of the diode ring mixer 100.

The second pulse forming circuit 24 has a somewhat modified form in the FIG. 4 embodiment since the subtractor 54 is now part of the diode ring mixer 100. The pulse forming circuit 24 is otherwise similar, however, including an impedance 48, transmission line 42, and two buffer amplifiers 50 and 52 connected as in the FIG. 1 embodiment. The outputs of the two buffer amplifiers 50 and 52 are in each case connected to a corresponding one of the two leads of the "radio frequency" (RF) input to the diode ring mixer 100.

The diode ring mixer 100 is a conventional, off-the-shelf item normally used to convert an RF signal to an IF frequency. It includes two input transformers 102 and 104, connected together through a diode ring 106. The primary winding of the transformer 102 is designated as the (LO) input to the diode ring mixer, since it normally represents the input to which a local oscillator (LO) signal is applied. Similarly, the two leads of the primary winding of the other transformer 104 are referred to as the (RF) leads, since these are the leads upon which a radio frequency (RF) input signal is normally applied. The center taps of the secondary windings of both the transformers 102 and 104 are also taken out of the diode ring mixer, and are normally designated as the (IF+) and (IF−) leads, since these are the leads across which the intermediate frequency (IF) output signal is normally taken.

The diode ring 106 consists of four diodes 110, 112, 114 and 116 connected in series with one another in a ring arrangement. The anode of each diode in the ring is connected to the cathode of the next successive diode in the ring. The junction between each pair of diodes is connected to a respective one of the leads from the ends of the secondary winding of transformers 102 and 104. Thus, the two leads from the ends of the secondary winding of transformer 102 are connected respectively to the junction between diodes 110 and 116 and the junction between diodes 112 and 114. The two leads of the secondary winding of transformer 104 are respectively connected to the junction between diode 110 and 112 and the junction between diodes 114 and 116.

The transformer 102 operates in conjunction with the diode ring 106 to effectively ground one or the other of the ends of the secondary of transformer 104. The output of the circuit is taken from the center tap of the secondary of transformer 104, and is positive or negative depending upon which of the two other leads of the secondary is grounded. If neither of the other leads is grounded, however, then the output is zero.

When the signal applied to the (LO) input is at a high level, then a positive voltage is applied across diodes 110 and 112 by the secondary windings of transformer 102. The diodes 110 and 112 are therefore conductive, creating a current path through those two diodes and through the secondary winding of transformer 102. Diodes 114 and 116 are reversed biased at this time, consequently no current flows through them. The voltage at the junction between diodes 110 and 112 is then at a ground potential, since the diodes 110 and 112 represent equal impedances, and since equal and opposite potentials are applied to them. One lead of the secondary of transformer 104 is thus effectively grounded. The other lead is open circuited, since the other two diodes 114 and 116 of the diode ring are reversed biased, and are thus nonconductive. In this case the output signal taken from the center tap of the secondary winding of transformer 104 has a certain polarity.

When the input signal applied to the (LO) input of the diode ring mixer has the opposite polarity, the conductive states of the four diodes are reversed. Diodes 110 and 112 are in this case reverse biased, whereas diodes 114 and 116 are forward biased. In this case the junction between diodes 114 and 116 is effctively grounded and the junction between diodes 110 and 112 is effectively open circuited. Thus, in this case the other half of the secondary of transformer 104 becomes active, and the output signal provided along the output line 108 has the opposite polarity as in the previous case. When no input signal is applied to the (LO) input of the diode ring mixer 100, however, neither of the ends of the secondary winding of transformer 104 are grounded, and the output signal along output line 108 has essentially a zero amplitude.

The diode ring mixer 100 provides the function of the coring circuit 56 of FIG. 1 since it is necessary for the input signal applied to the (LO) input to rise above a certain level before the diodes of the diode ring 106 will become active. The diode ring mixer also provides the multiplication function of multiplier 34 since the output signal provided along the output line 108 is essentially the product of the input signals applied to the (LO) and (RF) outputs. Finally, the diode ring mixer 100 provides the function of the subtractor 54 of FIG. 1, since the primary winding of transformer 104 is energized by only the difference between the signals provided at the outputs of buffer amplifiers 50 and 52.

The circuitry which has thus far been described measures horizontal register error. In other words, the circuitry measures the horizontal displacement between the two differently colored rasters formed on a television screen by the video signals whose registration is being determined. Misregistration may also, however, occur in a vertical direction. Consequently, it is desirable that means be provided for measuring vertical misregistration, as well. A preferred form of a vertical register error detection circuit is shown in FIG. 5.

Figure 5:
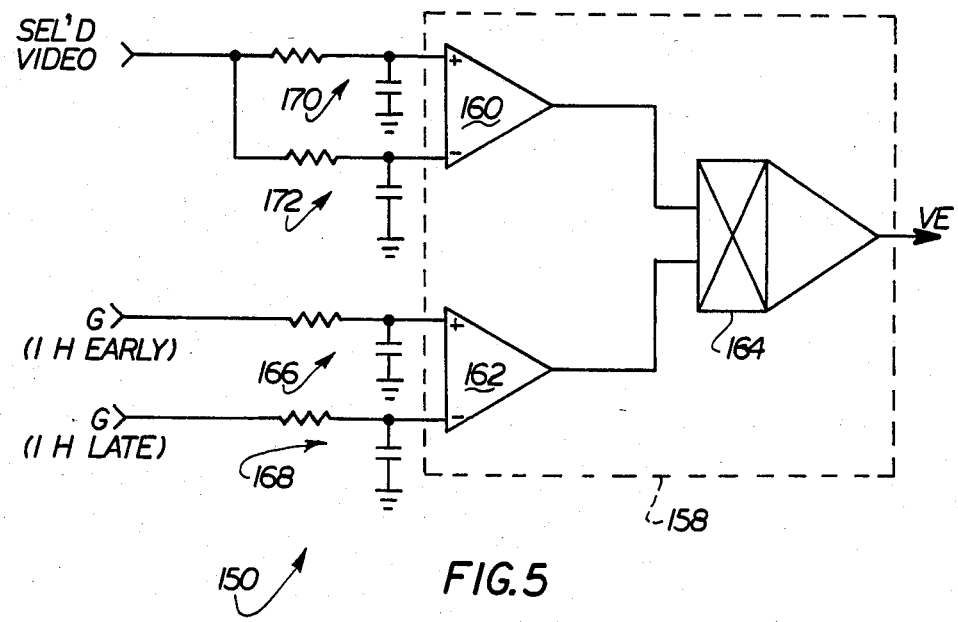
FIG. 5 is a circuit schematic of apparatus for detecting vertical misregistration.

The register error detection circuit 150 of FIG. 5 measures vertical register error by processing the selected video signal and two differently-delayed versions of the green video signal. These two differently-delayed versions of the green video signals are usually generated within the television camera for use in aperture correction. One of the green video signals (green-1H late) is delayed by one horizontal line with respect to the selected video signal, whereas the other (green-1H early) is advanced by one horizontal line with respect to the selected video signal. Thus, the total time delay between the two differently-delayed green video signals correspond to two horizontal lines of the video signal.

If the "early" and "late" green video signals are not available in the camera, they can be provided by delaying the selected video by one horizontal line and delaying the green video signal by two horizontal lines. The undelayed green video signal will then be one horizontal line in advance of the selected video signal, and the delayed green video signal will be one horizontal line retarded with respect to the selected video signal.

Generally stated, vertical register error is detected by subtracting the green-late video signal from the green-early video signal, and then multiplying the selected video signal by the difference signal which results from the subtraction process. This can perhaps more readily be seen from the waveforms of FIG. 6, which utilize idealized video signals for simplicity of description. In the FIG. 6 example, the scene being imaged is a white object on a black background, where the white object has a vertical extent corresponding to three scanning lines of one field of the raster, and has a horizontal extent corresponding to approximately one-third to one-half of the picture width. The result is a green video signal having a generally zero amplitude, but including pulses in three successive lines (where one line corresponds to the portion of the video signal between successive horizontal sync pulses). If vertical registration is correct, the pulses in the selected video signal should occur in the same lines as in the green video signal.

In the example of FIG. 6, the rasters are slightly vertically misregistered, whereby the three pulses actually occur one horizontal line later than the corresponding pulses in the green video signal. Vertical register error is detected by subtracting the green-late signal from the green-early signal, thereby producing a signal including several pulses 150 and 152 occurring at what might be referred to as the "leading vertical edge" of the white object producing the pulses, and two negative pulses 154 and 156 occurring at the trailing vertical edge of the object producing the pulses in the video signal. The difference signal is multiplied by the selected video signal so as to thereby produce a product signal which will include one positive and one negative pulse (pulses 152 and 154, respectively) if register is perfect, two negative pulses (154 and 156) if the two signals are misregistered in one direction (as in the example of FIG. 6), and two positive signals (150 and 152) if the two signals are misregistered in the opposite direction. Consequently, the integral of the product signal will vary with vertical misregister in a fashion which is similar to the manner in which the integral of the product signal produced in the horizontal register error detection circuit varies with horizontal misregister.

In the preferred embodiment of FIG. 5, the horizontal register error detection process outlined above is performed with the aid of a conventional integrated circuit 158 designed to perform analog multiplications. The integrated circuit multiplier 158 includes two subtractor circuits 160 and 162, and an analog multiplier circuit 164 which multiplies together the output signals provided by the two subtractors 160 and 162. The green-early and green-late signals are applied to the plus and minus inputs of signal substractor 162 through respective similar low-pass filters 166 and 168. Consequently, the output of signal substractor 162 corresponds to the difference signal by which the selected video is to be multiplied. The selected video signal is applied to both inputs of the other signal substractor 160 through respective low-pass filters 170 and 172. The two filters 170 and 172 provide different delays for the selected video signal. In the example being described, low-pass filter 170 has a time constant of approximately one microsecond, whereas low-pass filter 172 has a time constant of perhaps 100 times that. The net result of applying the selected video to both inputs of the signal subtractor 160 is that the average picture level of the signal is removed from the selected video. The overall operation of the circuit is otherwise essentially as described previously with respect to FIG. 6. The output (VE) of multiplier 164 is applied to an integrator such as integrator 36 of FIG. 1. The integrator output is in turn applied to a control circuit for adjusting vertical register in accordance with its output.

The misregistration error detection circuits which have been described above are useful in detecting and correcting not only vertical and horizontal misregistration, but also size errors, skew, etc. To correct for these errors, vertical and horizontal misregistration should be measured in a number of different areas of the picture so as to thereby provide information as to the fashion in which register error changes across the picture. This information can then be used to determine the extent of size error, skew, registration error, etc. Preferably, a digital processing system will be used for controlling the register error measurement system described hereinbefore, and for calculating the necessary corrections in at least register error and size from the register error measurements provided thereby. FIG. 7 illustrates a microprocessor-controlled auto set-up system employing the register error detectors described previously. The set-up system corrects horizontal and vertical centering and horizontal and vertical size in a color television camera.

In FIG. 7, the video signal forming circuitry is represented at 200. This video source represents the source of not only the red, blue, and green video signals, but also the green-early and green-late signals described with respect to FIGS. 5 and 6. The video source 200 also provides regularly occurring horizontal and vertical sync pulses defining the timing of the video signals provided thereby. A registration error measurement circuit 202 is included for measuring horizontal and vertical error in accordance with the processes described above. The register error detection circuit 202 includes a horizontal register error detector as shown in FIG. 4 and a vertical register error detector circuit as shown in FIG. 5. The output (HE) of the horizontal register error detector is applied to an integrator 204 through an analog switch 206, whereas the output (VE) of the vertical error detector circuit of FIG. 5 is applied to the input of the same integrator 204 through a different analog switch 208. The two switches 206 and 208 serve the function of the "window" switch 70 of FIG. 1. Only one of the two switches is closed at a given time, hence the integrator 204 responds to either the horizontal error signal pulses provided by the circuit of FIG. 4, or the vertical error signal pulses provided by the circuit of FIG. 5, but not both. Integrator 204 includes a reset switch corresponding to the reset switch 72 of FIG. 1 so that it can be reset at appropriate intervals.

All of the switches to be used in the register error detection system are solid state devices which are each controlled by the application of an appropriate logic signal to the control input of the switch. The red and blue selection switches 30 and 32 (FIG. 1) are controlled by a single logic signal, directly applied to the blue selection switch 30 and indirectly applied to the red selection switch 32 through a logic inverter. The controlling logic signal (i.e., the R/B selection signal) is taken from a latch circuit 210. The latch circuit 210 is loaded with a binary byte of data, one bit of which corresponds with the R/B selection signal, from a system bus 212 under control of a microprocessor 214. Other bits of the stored byte control switches 206 and 208. The microprocessor loads a new byte into latch 210 whenever the state of one of the switches is to be changed.

The microprocessor 214, which may be any conventional microprocessor, is interfaced with the system bus 212 in the standard manner. A read-only memory (ROM) circuit 216 and a random-access memory (RAM) circuit 218 are both also connected to the system bus. The ROM has the controlling program stored in it, and the RAM is used for scratch-pad storage of variable values during execution of the program.

The control program stored in the ROM 216 includes procedures for measuring vertical and horizontal registration error in five different windows across the raster being scanned by the video image forming device. The five windows within which register error can be measured are shown in FIG. 8. The microprocessor 214 locates the selected window by measuring predetermined delays after the vertical and horizontal sync pulses. The window $W_2$, for example, begins a delay $D_H$ after a horizontal sync pulse, where that horizontal sync pulse is itself delayed by a delay $D_V$ after each vertical sync pulse. Consequently, if horizontal error is to be measured in the window $W_2$, the switch 206 is closed by the microprocessor after a delay equal to $D_V+D_H$. The switch remains closed for a period of time $D_W$ corresponding to the length of time required for the image forming device to scan across the width of the window $W_2$. Thereafter, the switch 206 is reopened until a delay $D_H$ following the next succeeding horizontal sync pulse. The switch 206 is closed and then opened in similar fashion after each horizontal sync pulse until the image forming device begins scanning of the line immediately below the window $W_2$. The registration error measurement process is then finished.

In the embodiment being described, all delays are measured by the microprocessor, itself. The delays $D_V$ and $D_W$ are measured by counting horizontal sync pulses occurring after a vertical sync pulse. The delays $D_H$ and $D_L$, on the other hand, are determined by performing a predetermined number of program loops of known duration. Of course, programmable one-shots, programmable interval timers, or other circuits may instead be used.

Because the switch 206 is only closed during those periods in which the image forming device is scanning the window $W_2$, the integrator 204 integrates only those horizontal error signals (HE) occurring during the scanning of the window $W_2$. The output signal provided by the integrator 204 is therefore representative of the horizontal register error within the window $W_2$. Registration error in any one of the five windows $W_1$–$W_5$ can be determined by appropriate choice of the delays $D_V$ and $D_H$.

The microprocessor 214 controls the process of measurement of register error. The microprocessor 214 first applies an address on the system bus so as to cause an address decoding circuit 222 to apply a reset signal to the integrator 204. The microprocessor 214 then periodically opens and closes switch 206 in the manner described above so that the switch is only closed at times corresponding to the scanning of the chosen window. After the window has been completely scanned, the microprocessor 214 applies a "convert" command to analog/digital converter 220, causing it to convert the analog register error signal at the output of the integrator 204 into a corresponding digital word. The microprocessor 214 reads the digital word at the output of analog/digital converter 220 by applying an address on the system bus to cause the address decode circuit 222 to apply a "select" signal to the converter 220, whereby it gates its digital word onto the data bus portion on the system bus 212. The microprocessor 214 performs similar procedures when measuring horizontal and vertical error of either the red or blue signal within any of the windows $W_1$–$W_5$.

The microprocessor 214 utilizes the registration information obtained in the fashion indicated above to determine updated values for control signals which control horizontal and vertical size, and horizontal and vertical centering for the red and blue image forming devices. The updated control signals are loaded into eight analog signal storage cells 224 whose outputs are used to control the red and blue image forming devices in conventional fashions. Eight control words, in digital form, are sequentially applied to a digital-to-analog converter 226, and are latched therein by a strobe signal derived again from the address decoding circuit 222. The analog output of the digital/analog converter 226 is applied to the analog input of one of the eight storage cells 224 by an analog multiplexing circuit 228. The analog multiplexing circuit essentially consists of eight solid state switches, each operable to connect the output of the digital/analog converter 226 to a corresponding one of the eight storage cells 224. No more than one of the eight switches will be closed at a given time, with that one switch being selected by an address applied to the multiplexer 228 through the system bus 212 and an enable signal applied to the multiplexer 228 from the address decoding circuit 222.

The storage cells 224 each consist of a storage capacitor for storing the applied analog signal and a high impedance buffer amplifier for providing an interface between the capacitor and the video source 200. The capacitors associated with the storage cells 224 can only store the analog signal for a finite period of time before current leakage through the capacitors and other signal leads causes degradation of the analog control information. Consequently, the microprocessor 214 periodically reloads the storage cells 224 with the analog control signals to insure that the analog control signals remain at the specified values.

The auto set-up procedure performed by the microprocessor control system shown in FIG. 7 is initiated by the closure of a manual switch 230 connected to a serial input of the microprocessor 214. The input line is normally tied to a ±5 supply through a resistor 232, however closure of the switch 230 shunts the control line to ground, changing the logic signal applied to that control input from a logic "1" to a logic "0". The microprocessor senses the change in the logic state of the input signal, and procedes with the auto set-up procedure shown in flow chart form in FIGS. 9, 10 and 11.

Prior to depressing the switch, the operator should preferably point the camera at a scene bearing distinct, well defined vertical and horizontal edges so that the registration error measurement circuits can extract the edge-related information from the scene. It is not necessary to point the camera at a specific set-up chart, however.

FIG. 9 is a flow chart illustrating the overall flow of operations performed by the microcomputer during the set-up operation. Referring to FIG. 9, set-up operation begins at a step 300 when the microprocessor senses that an operator has depressed the switch 230. Upon initiation of the auto set-up procedure, the microcomputer proceeds at step 310 to store the current digital values of the eight control signals into temporary locations in the random access memory 218 of FIG. 7. In the next step (312) the microcomputer detects registration and size errors and adjusts the control signals so that the registration and size errors are eliminated. The error detection and correction procedures are described hereinafter with reference to FIGS. 10 and 11. In step 314, which follows the set-up procedure, the microprocessor examines the state of test flags whose conditions were affected during the set-up procedure 312. If the state of the test flags indicates that the set-up procedure was not successful in setting-up the camera, the microprocessor jumps to step 320. Otherwise, the microprocessor proceeds with step 316, in which the microprocessor replaces the previous control signal values with the new values obtained during the set-up procedure 312. The old control signal values are therefore eliminated from memory. In the next step (318) the microprocessor illuminates a lamp (not shown in FIG. 7) indicating that the set-up operation was successfully concluded. The microprocessor then exits the set up procedure.

If it was determined in step 314 that an acceptable set-up was not performed in step 312, the microprocessor executes step 320, wherein the previous control signal values are restored to the TV camera (i.e., loaded into the storage cells 224). The microprocessor thereafter (step 322) illuminates a second lamp (again, not shown in FIG. 7) indicating that the set up procedure was unsuccessful, and then exits the set-up procedure.

If the lamp indicating an unsuccessful set-up procedure is illuminated, the operator should redirect the camera at a different scene, and initiate the set up procedure once more.

Figure 10:
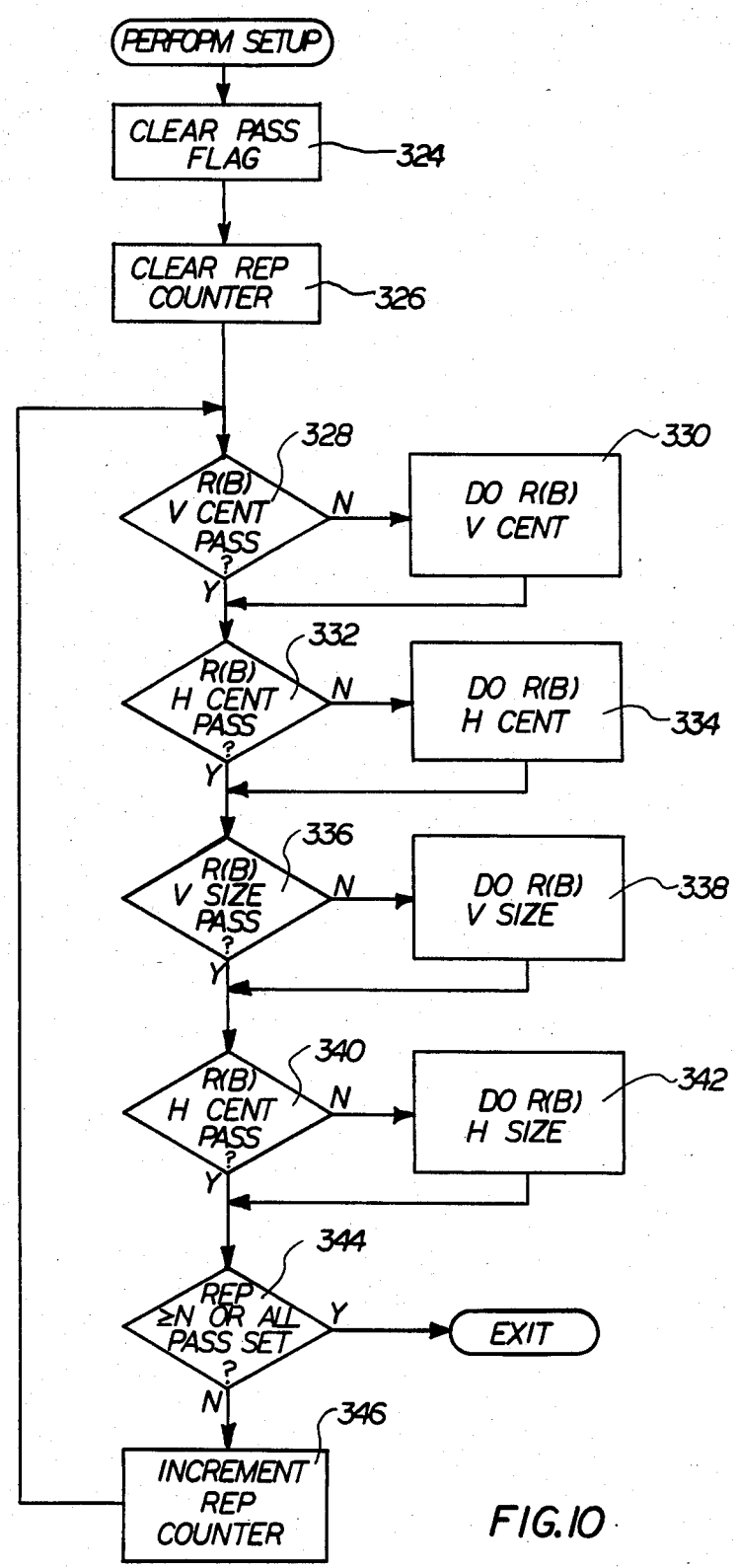

The steps conducted in the flow chart block 312 of FIG. 9 are set forth more specifically in FIG. 10. The procedure begins with a step 324 wherein the microprocessor clears the values of eight test flags, each associated with a corresponding one of the eight control signals which are adjusted during the set-up procedure. After this step each of the eight test flags indicates that its corresponding control parameter has not yet been set-up. In step 326 the microprocessor clears (i.e., zeros) the value of a "repetition" variable stored in memory. The microprocessor then proceeds to sequentially detect and correct errors in the settings of the eight control signals.

In step 328 the microprocessor examines the test flags associated with the red and blue vertical centering controls, and proceeds on to step 330 if the flag values indicate that the two control settings have not yet been properly adjusted. In step 330 the red and blue vertical centering controls are set-up. If the flag values indicate otherwise, however, the procedure bypasses step 330, proceeding instead to step 332. In the portion of the program which follows (steps 332–342), the microprocessor in similar fashion examines the test flags for horizontal centering, vertical size, and horizontal size for both the red and blue video signals, and proceeds to detect and correct errors in any of the ones for which the corresponding test flags indicate that the control settings have not been properly adjusted.

After completion of steps 340 and 342, the microprocessor proceeds to step 344, wherein it examines the test flags and the repetition count to determine whether the test flags are all at logic values of one (indicating the set-up has properly been concluded) or the repetition variable has a value greater than N (indicating that the processor has performed the error detection/correction steps N times without successfully completing the set-up procedure). If either condition exists, the microprocessor exits the procedure, returning to step 314 of FIG. 9. If, however, the repetition variable has a value less than N and not all of the test flags have logic values of one, the microprocessor proceeds on to step 346, wherein the repetition variable is incremented. The microprocessor then jumps back to step 328 to begin the iterative adjustment of the eight control settings again.

FIG. 11 indicates the operations performed by the microprocessor during the step 334 of FIG. 10. The first several steps in the procedure shown in FIG. 11 are included for the purpose of determining whether or not there is sufficient detail in the scene being viewed to permit an accurate registration determination to be made. This function is accomplished generally by measuring error (centering error, in this case) for a number of different control values. In the first step 350, the microprocessor iteratively sets different control values into the corresponding storage cell 224 of FIG. 7, and reads horizontal register error values from the output of the analog/digital converter 220. During this process, the switch 206 is controlled by the microprocessor in the manner described previously so that register error in window $W_1$ is measured. The control values loaded into the storage cell differ from one another by fixed amounts, so that the register error is measured at M control settings.

In step 352 the microprocessor examines the pattern formed by the M register error values obtained from the step 350 in response to the M different values of the control variable. The M points should lie along the central portion of the pattern shown in FIG. 3. If it is determined in step 352 that the pattern does define a line having adequate slope (thereby indicating that a sufficient level of detail is available in window $W_1$ of the scene being viewed to accomplish horizontal centering) then the microprocessor jumps to step 356. Otherwise, the microprocessor instead continues with step 354.

In step 354 the microprocessor sets the control variables to the minimum available value, and then increments through the range to find a control variable range in which the pattern crosses through zero and exhibits the desired linearity and slope. If the search routine is successful, the microprocessor continues with step 356. If the search routine is unsuccessful, however, the procedure continues with step 362, wherein the repetition variable is set to a limit value, thereby aborting the set-up procedure at step 344 thereafter. After step 362 the microprocessor exits from the procedure of FIG. 11, returning to the point in the procedure of FIG. 10 at which it was called.

If the required linear pattern is located either in step 352 or in step 354, the procedure continues with step 356. In step 356 the microprocessor identifies a control value for which the horizontal register error is approximately equal to zero. This is accomplished by iteratively adjusting the value of the control setting and measuring the error signal resulting from that control variable value. Once an error signal approximately equal to zero has been obtained in step 356, the procedures continues with step 358. In step 358, the microprocessor compares the current value of the control signal, as determined in step 356, with the old value of the control variable. If the difference is less than a specified tolerance, indicating that the determined value of the control variable is approximately the same as had been determined in the previous pass through the procedure, the microprocessor proceeds to step 360, wherein the pass flag for the blue (or red) horizontal centering control variable is set to one. After step 360, or if it is determined in step 358 that the difference between the control variables is not less than the tolerance, the microprocessor proceeds to step 364. In step 364 the microprocessor checks a "color" flag to determine whether horizontal centering has been completed for both colors. If not, the microprocessor proceeds to step 366, wherein the color flag is set, the state of the R/B selection switch is changed, and the program returned to step 350. If the color flag is already set, indicating that both colors have been processed, however, the microprocessor resets the color flag and the R/B selection switch and returns to step 336 of FIG. 10.

A procedure similar to the one illustrated in FIG. 11 is performed for each of the two color video signals (red and blue) for each of the blocks 330, 338, and 342 of FIG. 10.

In the vertical register error correction step 330, vertical registration error is measured in window $W_1$ at an array of M control signal values, and is corrected as in the FIG. 11 procedure. In the vertical size correction step 338, vertical size error is detected by measuring and then subtracting vertical register errors in windows $W_4$ and $W_5$. The vertical size error is measured at an array of M control signal values, and is corrected as in the FIG. 11 procedure. The horizontal size correction step 342 is similar to step 338, except that horizontal size error is detected by measuring and then subtracting the horizontal register errors in windows $W_2$ and $W_3$.

Although the invention has been described with respect to a preferred embodiment, it will be appreciated that various rearrangements and alterations of parts may be made without departing from the spirit and scope of the present invention, as defined in the appended claims.

What is claimed is:

1. Apparatus comprising:
   first means responsive to a first video signal for providing a first output signal including an AC pulse in timed relation to a scene edge-representative transition in said first video signal;
   second means responsive to a second video signal for providing a second output signal including a unipolar pulse in timed relation to a scene edge-representative transition in said second video signal;
   means for multiplying said first and second output signals together to provide a product signal whose integral is dependent upon the relative times of occurrence of said AC and unipolar pulses and thus upon the relative times of occurrence of the corresponding transitions in said first and second video signals; and,
   means for integrating said product signal to provide an integral signal having a level dependent upon and thus indicative of said relative times of occurrence of said corresponding transitions in said first and second video signals.

2. Apparatus as set forth in claim 1, wherein said first means comprises a first transmission line, said first video signal being applied to one end of said transmission line and the other end of said transmission line being effectively open circuited, and subtractor means for providing a difference signal corresponding to the difference between the signals appearing on first and second inputs thereof, said first and second inputs being coupled to respective ends of said first transmission line whereby said difference signal provided by said subtractor means includes an AC pulse for each transition appearing in said applied video input signal.

3. Apparatus as set forth in claim 1, wherein said second means comprises a second transmission line, said second video signal being applied to one end of said transmission line through an impedance and the other end of said transmission line being grounded, whereby the signal appearing at said one end of said transmission line includes a unipolar pulse for each transition appearing in said applied video signal.

4. Apparatus as set forth in claim 1, wherein said means for multiplying said first and second output signals together comprises a diode ring mixer.

5. Apparatus as set forth in claim 4, wherein said diode ring mixer has LO and RF input terminals and IF output terminals, said first and second output signals being applied to respective ones of said LO and RF input terminals such that said product signal appears at said IF output terminals.

6. Apparatus as set forth in claim 1, and further comprising a coring circuit for removing low amplitude noise from said second output signal.

7. Apparatus for providing pulses in response to edge-representative transitions in a video signal, comprising:
   a first transmission line providing a video signal delay of T sec,
   subtractor means for providing a difference signal corresponding to the difference between the signals appearing on the two ends of said first transmission line, and
   impedance means adapted to receive a video input signal and to apply said video input signal to one of said ends of said first transmission line, whereby said difference signal includes a pulse for each edge-representative transition appearing in said video input signal.

8. Apparatus as set forth in claim 7, wherein the end of said transmission line opposite the end to which said video input signal is applied is grounded, whereby a unipolar pulse is provided in response to each edge-representative transition in said first video signal.

9. Apparatus as set forth in claim 7, wherein the end of said transmission line opposite the end to which said video input signal is applied is substantially open-circuited, whereby an AC pulse is provided in response to each edge-representative transition in said first video signal.

10. Apparatus comprising:
    first means responsive to a first video signal for providing a first output signal including first features generated responsive to transitions in said first video signal which represent edges of portions of the scene represented by said first video signal, said first features each including a first part having a first polarity and a second part having the opposite polarity, said first and second parts occurring in timed relation to the corresponding said transition in said first video signal;

second means responsive to a second video signal for providing a second output signal including second features generated responsive to transitions in said second video signal which represent edges of portions of the scene represented by said second video signal, each of said second features being unipolar and occurring in timed relation to the corresponding said transition to said second video signal; and means for multiplying said first and second output signals together to provide a product signal including third features corresponding to the product of said first and second features, the integral of said third features being dependent upon the relative times of occurrence of said first and second features and thus upon the relative times of occurrence of the corresponding transitions in said first and second video signals; and, means for integrating said product signal to provide an integral signal having a level dependent upon and thus indicative of said relative times of occurrence of said corresponding transitions in said first and second video signals.

11. Apparatus as set forth in claim 10, wherein said first means comprises a first impedance, a first transmission line having said first video signal applied to one end thereof through said first impedance and the other end effectively open circuited, and means for providing a first output signal corresponding to the difference between the signals appearing on the two ends of said transmission line, and wherein said second means comprises a second impedance, a second transmission line having said second video signal applied to one end thereof through said second impedance and the other end effectively shorted to ground, and means for providing a second output signal corresponding to the signal at the junction between said second impedance and said second transmission line.

12. Apparatus as set forth in claim 11, wherein said first and second transmission lines provide equal signal delays.

13. Apparatus as set forth in claim 11, wherein said multiplying means comprises a diode ring mixer, and wherein said first and second output signals are applied to the two inputs of said ring mixer whereby said product signal appears at the output thereof.

14. Apparatus as set forth in claim 10, and further comprising control means responsive to said integral signal for adjusting the relative timing of said first and second video signals in accordance with said integral signal.

15. Apparatus as set forth in claim 14, wherein said control means comprises means for providing a control signal which is effective to control the relative timing of said first and second video signals, for methodically varying said control signal and measuring the resulting changes in said integral signal, and for terminating the adjustment if the changes in said integral signal do not meet predetermined criterion.

16. Apparatus as set forth in claim 15, wherein said control signal providing means includes means for providing an operator sensible signal indicating that the adjustment of the video signals has not been completed when said changes in said integral signal do not meet said predetermined criterion.

17. Apparatus for adjusting the registration of two video signals generated by respective imaging devices in a television camera, comprising:

register error measurement means responsive to said two video signals for providing a register error signal which varies in accordance with the amount of detail in the scene of which said video signals are representative and with the degree of misregistration between said two video signals, and means responsive to said register error signal for providing a control signal effective to adjust the relative timing of said two video signals and thus the degree of misregistration between them, said means including means for methodically adjusting said control signal over a range of values, monitoring the resulting changes in said register error signal, and restoring said control signal to a previously determined value if said resulting changes in said register error signal indicate that inadequate levels of detail are present in the video signal for a new control signal value to be accurately determined.

18. Apparatus as set forth in claim 17, wherein said register error measurement means comprises first means responsive to a first one of said two video signals for providing a first pulse signal including an AC pulse in timed relation to a scene edge-representative transition in said first video signal, second means responsive to a second one of said two video signals for providing a second pulse signal including a unipolar pulse in timed relation to a scene edge-representative transition in said second video signal, means for multiplying said first and second pulse signals together to provide a product signal whose integral is dependent upon the relative times of occurrence of said AC and unipolar pulses and thus upon the relative times of occurrence of the corresponding transitions in said first and second video signals, and means for integrating said product signal to thereby provide said register error signal.

19. Apparatus as set forth in claim 17, wherein said control means comprises a microprocessor.

20. Apparatus as set forth in claim 19 and further comprising means for providing an initiating signal for the purpose of initiating an adjustment of the control signal to eliminate register error, and wherein said microprocessor is programmed to respond to said initiating signal by methodically adjusting said control signal over said range of values, monitoring the resulting changes in said register error signal, and adjusting said control signal for zero register error if said resulting changes meet predetermined criterion.

21. Apparatus as set forth in claim 17, wherein said control means includes means for enabling said register error measurement means only during those portions of said video signals representing a selected portion of said imaged scene.

22. A method of correcting misregistration between two color video signals generated by different imaging devices in a color television camera, comprising the steps of:

processing one of the two video signals to generate a first pulse signal including an AC pulse in response to a level transition in the first video signal, the AC pulse occurring in a known time relation to the level transition, processing the other of the two video signals to generate a second pulse signal including a unipolar pulse in response to a level transition in the second video signal, the unipolar pulse occurring in the same known time relation to the level transition as are the AC pulses, processing the first and second pulse signals to provide a register error signal corresponding to the time integral of the product of the first and second pulse signals, and adjusting the registration of the two color video signals in accordance with the register error signal.

* * * * *